(12) United States Patent
Yomo et al.

(10) Patent No.: US 11,874,391 B2
(45) Date of Patent: Jan. 16, 2024

(54) RADAR APPARATUS

(71) Applicant: Panasonic Intellectual Property Management Co., Ltd., Osaka (JP)

(72) Inventors: Hidekuni Yomo, Kanagawa (JP); Tomohiro Yui, Kanagawa (JP); Kenta Iwasa, Tokyo (JP); Junji Sato, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 388 days.

(21) Appl. No.: 17/208,226

(22) Filed: Mar. 22, 2021

(65) Prior Publication Data

US 2021/0293921 A1   Sep. 23, 2021

(30) Foreign Application Priority Data

Mar. 23, 2020   (JP) .................. 2020-051566

(51) Int. Cl.
*G01S 7/03*   (2006.01)
(52) U.S. Cl.
CPC .................... *G01S 7/038* (2013.01)
(58) Field of Classification Search
None
See application file for complete search history.

(56) References Cited

U.S. PATENT DOCUMENTS

| 2015/0355322 | A1* | 12/2015 | Oshima ................ G01S 13/46 342/116 |
| 2016/0018511 | A1 | 1/2016 | Nayyar et al. |
| 2018/0309474 | A1* | 10/2018 | Cheung ................. G01S 7/52 |
| 2019/0129002 | A1 | 5/2019 | Roger et al. |
| 2021/0318413 | A1* | 10/2021 | Arkind ................ G01S 13/34 |

FOREIGN PATENT DOCUMENTS

| JP | 2009-281775 A | 12/2009 |
| JP | 2017-521669 A | 8/2017 |
| JP | 2019-078756 A | 5/2019 |

* cited by examiner

*Primary Examiner* — Whitney Moore
(74) *Attorney, Agent, or Firm* — GREENBLUM & BERNSTEIN, P.L.C.

(57) ABSTRACT

Performance of a radar apparatus including a plurality of transceiver ICs is improved. The radar apparatus includes: a plurality of integrated circuit, which, in operation, perform signal processing on a received signal; and a signal processing circuit, which, in operation, compensates for a deviation between the plurality of integrated circuits based on a difference between leak radio wave components received by receive antennas corresponding respectively to the plurality of integrated circuits.

9 Claims, 8 Drawing Sheets

| PARAMETER OF IC 201 | PARAMETER OF IC 202 | MEASURED LEAK COMPONENT PHASE DIFFERENCE |
|---|---|---|
| p1 | p2 | $\Delta\phi 12$ |
| p2 | p1 | $\Delta\phi 21$ |
|    | p3 | $\Delta\phi 23$ |
| p3 | p2 | $\Delta\phi 32$ |
|    | p4 | $\Delta\phi 34$ |
| p4 | p3 | $\Delta\phi 43$ |
|    | p5 | $\Delta\phi 45$ |
| p5 | p4 | $\Delta\phi 54$ |
|    | p6 | $\Delta\phi 56$ |
| p6 | p5 | $\Delta\phi 65$ |
|    | p7 | $\Delta\phi 67$ |
| p7 | p6 | $\Delta\phi 76$ |
|    | p8 | $\Delta\phi 78$ |
| p8 | p7 | $\Delta\phi 87$ |

FIG. 5

| PARAMETER OF IC 201 | PARAMETER OF IC 202 | MEASURED LEAK COMPONENT PHASE DIFFERENCE SET |
|---|---|---|
| p1 | p2 | ($\Delta\phi$a1c2, $\Delta\phi$a1d2, $\Delta\phi$b1c2, $\Delta\phi$b1d2) |
| p2 | p1 | ($\Delta\phi$a2c1, $\Delta\phi$a2d1, $\Delta\phi$b2c1, $\Delta\phi$b2d1) |
| p2 | p3 | ($\Delta\phi$a2c3, $\Delta\phi$a2d3, $\Delta\phi$b2c3, $\Delta\phi$b2d3) |
| p3 | p2 | ($\Delta\phi$a3c2, $\Delta\phi$a3d2, $\Delta\phi$b3c2, $\Delta\phi$b3d2) |
| p3 | p4 | ($\Delta\phi$a3c4, $\Delta\phi$a3d4, $\Delta\phi$b3c4, $\Delta\phi$b3d4) |
| p4 | p3 | ($\Delta\phi$a4c3, $\Delta\phi$a4d3, $\Delta\phi$b4c3, $\Delta\phi$b4d3) |
| p4 | p5 | ($\Delta\phi$a4c5, $\Delta\phi$a4d5, $\Delta\phi$b4c5, $\Delta\phi$b4d5) |
| p5 | p4 | ($\Delta\phi$a5c4, $\Delta\phi$a5d4, $\Delta\phi$b5c4, $\Delta\phi$b5d4) |
| p5 | p6 | ($\Delta\phi$a5c6, $\Delta\phi$a5d6, $\Delta\phi$b5c6, $\Delta\phi$b5d6) |
| p6 | p5 | ($\Delta\phi$a6c5, $\Delta\phi$a6d5, $\Delta\phi$b6c5, $\Delta\phi$b6d5) |
| p6 | p7 | ($\Delta\phi$a6c7, $\Delta\phi$a6d7, $\Delta\phi$b6c7, $\Delta\phi$b6d7) |
| p7 | p6 | ($\Delta\phi$a7c6, $\Delta\phi$a7d6, $\Delta\phi$b7c6, $\Delta\phi$b7d6) |
| p7 | p8 | ($\Delta\phi$a7c8, $\Delta\phi$a7d8, $\Delta\phi$b7c8, $\Delta\phi$b7d8) |
| p8 | p7 | ($\Delta\phi$a8c7, $\Delta\phi$a8d7, $\Delta\phi$b8c7, $\Delta\phi$b8d7) |

FIG. 6

| PARAMETER OF IC 201 | PARAMETER OF IC 202 | MEASURED LEAK COMPONENT VECTOR DIFFERENCE SET |
|---|---|---|
| p1 | p1 | ($\Delta$va1c1, $\Delta$va1d1, $\Delta$vb1c1, $\Delta$vb1d1) |
|    | p2 | ($\Delta$va1c2, $\Delta$va1d2, $\Delta$vb1c2, $\Delta$vb1d2) |
| p2 | p1 | ($\Delta$va2c1, $\Delta$va2d1, $\Delta$vb2c1, $\Delta$vb2d1) |
|    | p2 | ($\Delta$va2c2, $\Delta$va2d2, $\Delta$vb2c2, $\Delta$vb2d2) |
|    | p3 | ($\Delta$va2c3, $\Delta$va2d3, $\Delta$vb2c3, $\Delta$vb2d3) |
| p3 | p2 | ($\Delta$va3c2, $\Delta$va3d2, $\Delta$vb3c2, $\Delta$vb3d2) |
|    | p3 | ($\Delta$va3c3, $\Delta$va3d3, $\Delta$vb3c3, $\Delta$vb3d3) |
|    | p4 | ($\Delta$va3c4, $\Delta$va3d4, $\Delta$vb3c4, $\Delta$vb3d4) |
| p4 | p3 | ($\Delta$va4c3, $\Delta$va4d3, $\Delta$vb4c3, $\Delta$vb4d3) |
|    | p4 | ($\Delta$va4c4, $\Delta$va4d4, $\Delta$vb4c4, $\Delta$vb4d4) |
|    | p5 | ($\Delta$va4c5, $\Delta$va4d5, $\Delta$vb4c5, $\Delta$vb4d5) |
| p5 | p4 | ($\Delta$va5c4, $\Delta$va5d4, $\Delta$vb5c4, $\Delta$vb5d4) |
|    | p5 | ($\Delta$va5c5, $\Delta$va5d5, $\Delta$vb5c5, $\Delta$vb5d5) |
|    | p6 | ($\Delta$va5c6, $\Delta$va5d6, $\Delta$vb5c6, $\Delta$vb5d6) |
| p6 | p5 | ($\Delta$va6c5, $\Delta$va6d5, $\Delta$vb6c5, $\Delta$vb6d5) |
|    | p6 | ($\Delta$va6c6, $\Delta$va6d6, $\Delta$vb6c6, $\Delta$vb6d6) |
|    | p7 | ($\Delta$va6c7, $\Delta$va6d7, $\Delta$vb6c7, $\Delta$vb6d7) |
| p7 | p6 | ($\Delta$va7c6, $\Delta$va7d6, $\Delta$vb7c6, $\Delta$vb7d6) |
|    | p7 | ($\Delta$va7c7, $\Delta$va7d7, $\Delta$vb7c7, $\Delta$vb7d7) |
|    | p8 | ($\Delta$va7c8, $\Delta$va7d8, $\Delta$vb7c8, $\Delta$vb7d8) |
| p8 | p7 | ($\Delta$va8c7, $\Delta$va8d7, $\Delta$vb8c7, $\Delta$vb8d7) |
|    | p8 | ($\Delta$va8c8, $\Delta$va8d8, $\Delta$vb8c8, $\Delta$vb8d8) |

FIG. 7

RADAR APPARATUS

TECHNICAL FIELD

The present disclosure relates to a radar apparatus.

BACKGROUND ART

For example, a radar apparatus that uses a radio signal such as a millimeter-wave band may be configured to include a plurality of transceiver integrated circuits (ICs).

CITATION LIST

Patent Literature

PLT 1
Japanese Patent Application Laid-Open No. 2019-281775

SUMMARY OF INVENTION

However, there is room to study on how to improve the performance of a radar apparatus including a plurality of transceiver ICs.

A non-limiting and exemplary embodiment of the present disclosure facilitates providing a radar apparatus capable of improving the performance of a radar apparatus including a plurality of transceiver ICs.

A radar apparatus according to an exemplary embodiment of the present disclosure includes: a plurality of integrated circuitries, which, in operation, perform signal processing on a received signal; and signal processing circuitry, which, in operation, compensates for a deviation between the plurality of integrated circuitries based on a difference between leak radio wave components received by receive antennas corresponding respectively to the plurality of integrated circuitries.

Note that these generic or specific exemplary aspects may be achieved by a system, an apparatus, a method, an integrated circuit, a computer program, or a recoding medium, and also by any combination of the system, the apparatus, the method, the integrated circuit, the computer program, and the recoding medium.

According to an exemplary embodiment of the present disclosure, it is possible to improve the performance of a radar apparatus including a plurality of transceiver ICs.

Additional benefits and advantages of an exemplary embodiment of the present disclosure will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 5 is a diagram illustrating an example of an association between parameters and a leak component phase difference according to the first embodiment;

FIG. 6 is a diagram illustrating an example of an association between parameters and a set of leak component phase differences according to the first embodiment;

FIG. 7 is a diagram illustrating an example of an association between parameters and a set of leak component vector differences according to the first embodiment.

DESCRIPTION OF EMBODIMENTS

Figure 1:
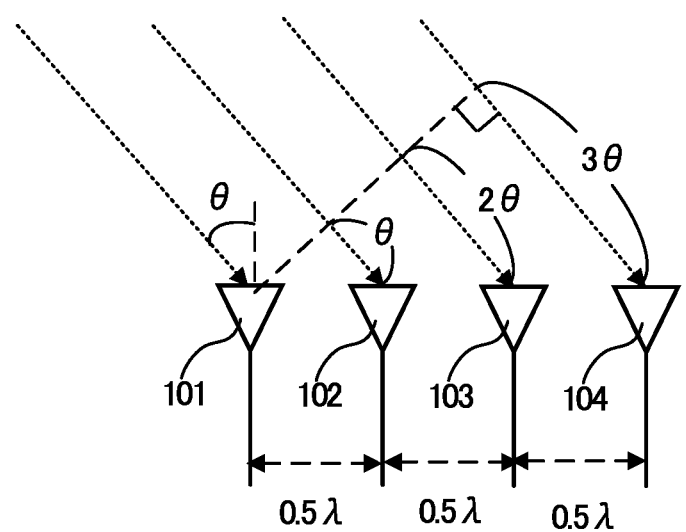
FIG. 1 is a diagram illustrating an example of direction-of-arrival estimation.

Embodiments of the present disclosure will be described below in detail with reference to the drawings. Note that each of the embodiments described below is merely an example, and the present disclosure is not limited by the following embodiments.

For example, as a sensor for realizing safety assurance such as collision avoidance (safety assurance controller) or automatic driving (automatic driving controller), a millimeter-wave radar whose detection performance is hardly deteriorated even in the surrounding environment of bad weather such as snow or fog has been attracting attention. Such a millimeter-wave radar is also expected to be applied, for example, to infrastructure facilities (monitoring systems) that monitor intersections or roads, or unauthorized intrusion by suspicious individuals, and is expanding applications as an all-weather sensor. In these application scenes, the millimeter-wave radar is expected, for example, to realize a two-dimensional angular measurement radar that enables imaging by detecting an elevation angle in a vertical direction in addition to an azimuth angle in a horizontal direction.

As a configuration for improving resolutions of both the horizontal direction and the vertical direction in the two-dimensional angular measurement radar, such a configuration in which multiple transmit and receive antennas are provided may be mentioned, for example. Here, when a transceiver IC connected to the transmit and receive antennas is constituted by many transmit and receive circuits, there is a possibility that heat generation, decrease in reliability, or yield may occur. Therefore, it has been studied to realize a two-dimensional angular measurement radar using a plurality of transceiver ICs whose number corresponds to the number of antennas used in a one-dimensional angular measurement radar, for example.

Further, a transceiver IC that a radar apparatus includes may be automatically calibrated (hereinafter, also referred to as automatic calibration), for example. The transceiver IC may perform automatic calibration to compensate for characteristic variation, depending on environmental variation such as temperature change, for example.

For example, when the radar apparatus includes a plurality of transceiver ICs, such a configuration may be possible in which the same local signal or chirp signal is inputted from the outside for synchronization between the plurality of transceiver ICs.

On the other hand, for example, even when a plurality of transceiver ICs are mounted on the same circuit board, the degree of influence of heat generation by other circuits (e.g., power supply ICs) disposed around the plurality of transceiver ICs respectively may be different for each transceiver IC. Therefore, it may be assumed that an appropriate configuration parameter is different for each transceiver IC. Thus, with respect to the automatic calibration function, there may be a scheme in which each of the plurality of transceiver ICs independently performs automatic calibration adaptively. In other words, it may be assumed that the automatic calibration is not operated uniformly in the plurality of transceiver ICs.

When the automatic calibration to follow the environmental variation such as temperature variation is performed independently for each of the plurality of transceiver ICs, there is a possibility that variation in phase difference (e.g., relative phase) between antennas connected to the plurality of transceiver ICs respectively may occur, for example. This variation in phase difference between antennas may cause an influence such as an error in direction-of-arrival estimation or a deterioration in detection performance in the radar apparatus, for example.

As a method for reducing such an influence, such a method has been proposed in which a plurality of phase differences between antennas (e.g., array antenna) connected to the same chip (e.g., transceiver IC) is determined, and when the plurality of phase differences are substantially constant and the number of targets may be deemed to be one, and when a difference between the phase difference between antennas connected to different chips and the phase difference between antennas connected to the same chip is equal to or greater than a threshold value, it is determined that the characteristics of the respective chips are mismatched, thereby performing compensation (e.g., see PTL 1), for example.

However, this method is based on the premise that either one of a radar transmitter and a radar receiver in the radar apparatus is composed of a single chip, so that it may be difficult to apply to such a configuration in which both the radar transmitter and the radar receiver are composed of a plurality of transceiver ICs, for example.

Further, in this method, there is a possibility that again of digital beamforming using antennas (e.g., array antenna) connected to the plurality of transceiver ICs during the compensation operation is reduced due to the mismatch in characteristics between the transceiver ICs, for example. Furthermore, in this method, the radar apparatus performs compensation processing by detecting a target. Therefore, this method may be difficult to apply to a target that is detectable when the gain is improved by the digital beamforming using a plurality of antennas (e.g., a target having a low reflection intensity), for example.

In other words, this method is based on the premise that it applies to a target having a high reflection intensity, such as corresponding to the gain by the digital beamforming, so that detection performance for the target having the low reflection intensity may deteriorate, for example. Further, this method is susceptible to noise if a reflection intensity is not sufficient, so that there is a possibility that measurement accuracy of a phase difference between the respective antennas deteriorates and compensation operation to assume cannot be performed, for example.

Therefore, in an exemplary embodiment of the present disclosure, an example of a method for improving the performance of a radar apparatus including a plurality of transceiver ICs will be described. According to an exemplary embodiment of the present disclosure, the radar apparatus is composed of a plurality of transceiver ICs, enabling stable operation even in such a configuration in which the individual transceiver ICs perform automatic calibration independently, for example.

Note that the radar apparatus may be mounted on a moving object such as a vehicle, or may be mounted on a roadside device or monitoring device of a road, for example.

Embodiment 1

[Direction-of-Arrival Estimation]

FIG. 1 is a diagram illustrating a concept relating to direction-of-arrival estimation using an array antenna (e.g., referred to as a receive array antenna) that a radar receiver of a radar apparatus includes.

In FIG. 1, the receive array antenna includes receive antennas (or also referred to as antenna elements) 101, 102, 103, and 104, for example. Receive antennas 101, 102, 103, and 104 may be arranged at 0.5λ intervals, assuming that the wavelength at the center frequency of the radio wave used in the radar apparatus is λ, for example. Note that the antenna interval is not limited to 0.5λ.

For example, when a reflected wave obtained by reflecting a signal transmitted from a radar transmitter (not shown) of the radar apparatus by an object (e.g., a target) is incident from the direction of an angle θ with respect to the receive array antenna shown in FIG. 1, phase rotation may occur due to the difference in optical path length corresponding to each receive antenna. For example, as shown in FIG. 1, when receive antenna 101 is assumed to serve as a reference, phase rotations of θ, 2θ, and 3θ may occur for radio waves incident into receive antennas 102, 103, and 104, respectively. The radar apparatus can estimate the direction of the reflected wave based on phase rotation amounts of the respective receive antennas, for example.

[Exemplary Configuration of Radar Apparatus Including Multiple Transceiver ICs]

Figure 2:
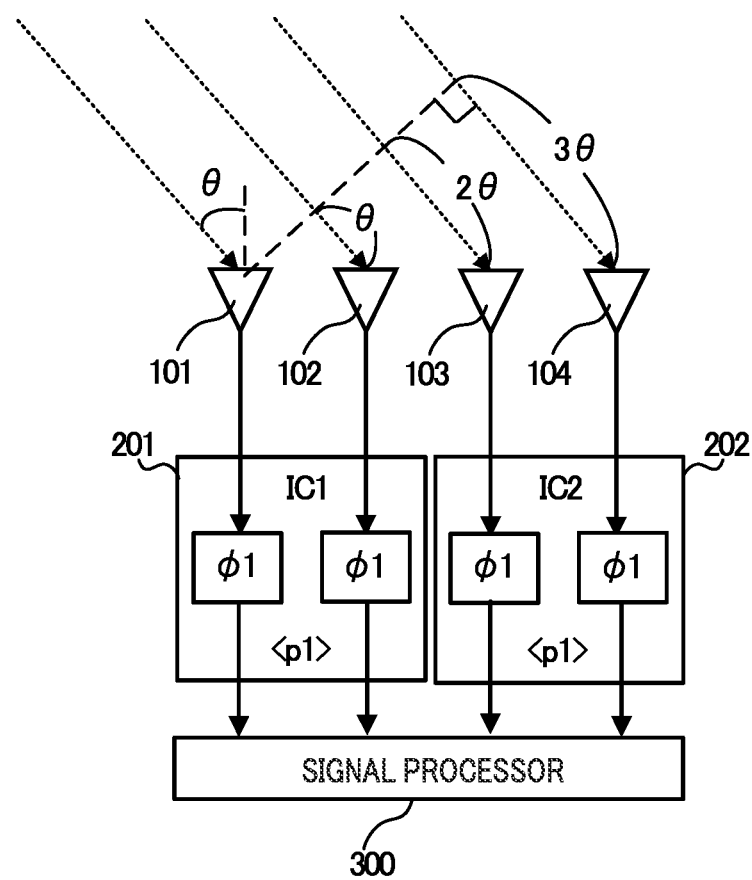
FIG. 2 is a diagram illustrating an example of a radar apparatus including a plurality of transceiver ICs.
Figure 3:
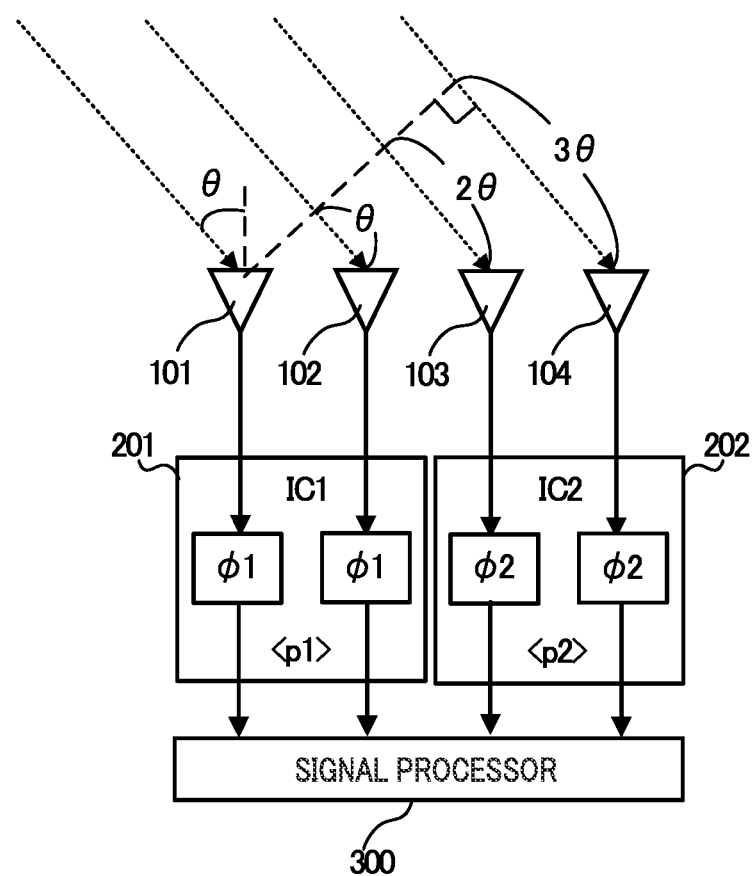
FIG. 3 is a diagram illustrating another example of the radar apparatus including the plurality of transceiver ICs.

FIGS. 2 and 3 are block diagrams illustrating examples of configurations of the radar receiver of the radar apparatus. In the radar receiver, a plurality of transceiver ICs may be connected to the receive array antenna, for example.

In FIGS. 2 and 3, two of transceiver IC 201 (also referred to as IC1) and transceiver IC 202 (also referred to as IC2) are connected to the receive array antenna, for example. For example, in FIGS. 2 and 3, receive antenna 101 and receive antenna 102 are connected to transceiver IC 201, and receive antenna 103 and receive antenna 104 are connected to transceiver IC 202.

In FIGS. 2 and 3, transceiver IC 201 and transceiver IC 202 may include a receiver of at least one branch (also referred to as a channel), for example. Further, transceiver IC 201 and transceiver IC 202 may include a transmitter of at least one branch, for example.

Transceiver IC 201 and transceiver IC 202 perform reception signal processing such as, for example, amplification, mixing, and A/D conversion, on signals received at the receive array antenna (e.g., the plurality of receive antennas). Further, transceiver IC 201 and transceiver IC 202 may perform automatic calibration depending on environmental variation such as temperature change to configure (e.g., adjust) parameters to be configured in the respective transceiver ICs, for example.

Parameters configured in the transceiver ICs may include information on the automatic calibration such as a gain of a power amplifier (PA) in the radar transmitter of the radar apparatus and a gain of a low noise amplifier (LNA) in the radar receiver, for example.

Further, in FIGS. 2 and 3, signal processor 300 may perform signal processing (e.g., digital signal processing) using signals outputted from the plurality of transceiver ICs 201, 202, for example.

For example, signal processor 300 may perform direction-of-arrival estimation by digital beamforming based on beat signals outputted from transceiver ICs 201, 202, and may output the direction-of-arrival estimation result to a safety assurance controller, an automatic driving controller, or a monitoring system which are not shown. Note that each of the beat signals may be generated by mixing a chirp signal from the radar transmitter (not shown) (i.e., a radar transmission signal) and a reception signal (i.e., a reflected wave signal) in transceiver ICs 201, 202, for example.

For example, transceiver IC 201 and transceiver IC 202 may have the ability to measure temperatures within the respective transceiver ICs. For example, transceiver IC 201 and transceiver IC 202 may perform control of gain-related parameters (i.e., automatic calibration) so as to compensate for variation in gain depending on temperature change.

Here, at least one of an amplitude and a phase of the signal may change with the control of the gain in the transceiver ICs, for example. For example, in transceiver IC 201 and transceiver IC 202 shown in FIGS. 2 and 3, phase rotation φ that depends on parameter p to be configured may occur.

For example, as shown in FIG. 2, when the parameters configured for transceiver IC 201 and transceiver IC 202 are common (e.g., in a case of parameter p1), the phase rotations that occur in transceiver IC 201 and transceiver IC 202 also tend to be similar values (e.g., phase rotation φ1). Therefore, the phase difference is unlikely to occur between transceiver IC 201 and transceiver IC 202 (i.e., between array antenna output branches).

On the other hand, as shown in FIG. 3, when the parameters configured for transceiver IC 201 and transceiver IC 202 are different (e.g., parameters p1≠p2), the phase rotations that occur in transceiver IC 201 and transceiver IC 202 also tend to be different (e.g., phase rotations φ1≠φ2).

Therefore, a phase error of $\Delta\varphi=(\varphi 1-\varphi 2)$ may occur between transceiver IC 201 and transceiver IC 202. For example, in FIG. 3, phase difference Δφ between the transceiver ICs, in addition to a phase difference related to phase rotation θ depending on the difference in optical path length, may occur between a signal received by receive antenna 101 that is connected to transceiver IC 201 and signals received respectively by receive antenna 103 and receive antenna 104 that are connected to transceiver IC 202. Note that phase difference Δφ as described above is unlikely to occur between signals received by the receive antennas that are connected to the same transceiver IC.

Therefore, in FIG. 3, when receive antenna 101 is assumed to serve as a reference, phase differences of signals that are inputted to signal processor 300 may be θ, 2θ−Δφ, and 3θ−Δφ with respect to radio waves incident into receive antennas 102, 103, and 104, respectively, for example. Therefore, in signal processor 300, there is a possibility that an error occurs in the direction-of-arrival estimation.

[Exemplary Configuration of Radar Apparatus According to Exemplary Embodiment of Present Disclosure]

Figure 4:
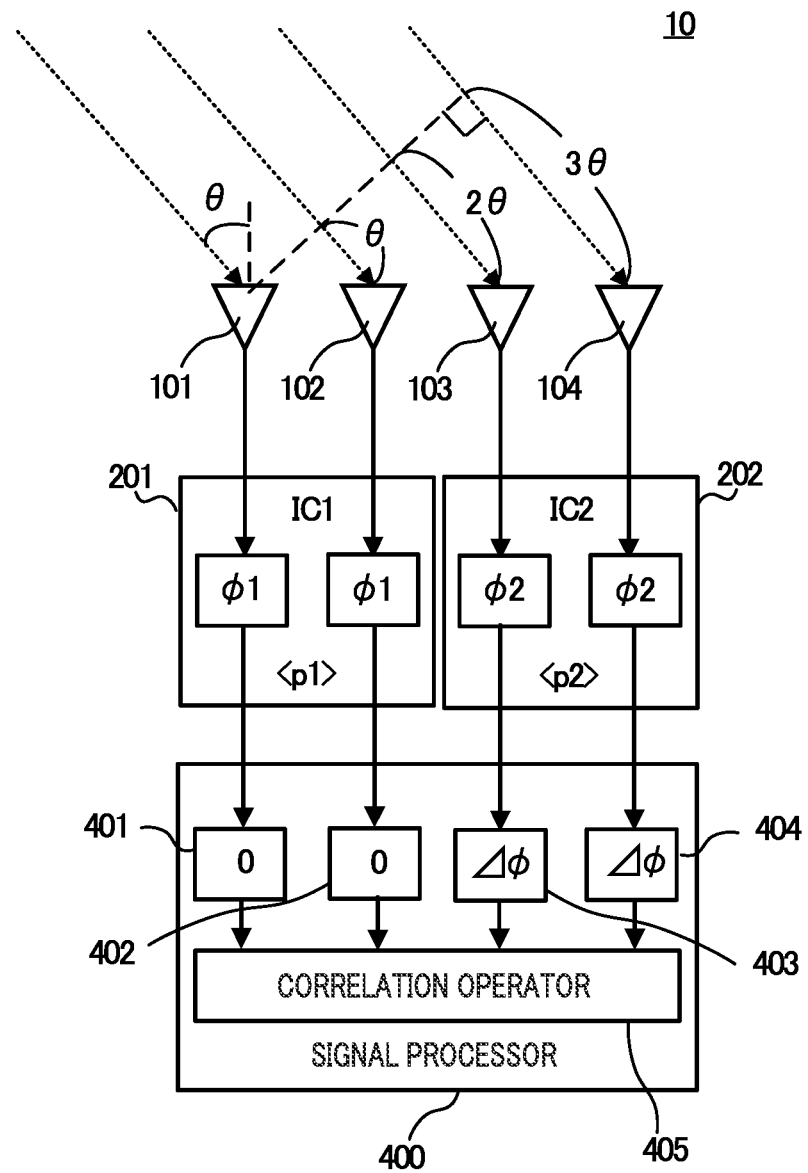
FIG. 4 is a diagram illustrating an example of a radar apparatus according to a first embodiment.

FIG. 4 is a diagram illustrating an example of a configuration of a radar receiver that radar apparatus 10 according to an exemplary embodiment of the present disclosure includes. In the radar receiver shown in FIG. 4, the same constituent elements as those in FIG. 2 or FIG. 3 are identified with the same numerals, and a description thereof is omitted.

Signal processor 400 shown in FIG. 4 (corresponding to a signal processing circuit, for example) may have a configuration to compensate for (i.e., a configuration to cancel) phase error components (e.g., Δφ) that may occur in transceiver IC 201 and transceiver IC 202, in addition to the same processing as that in signal processor 300 shown in FIG. 2 or FIG. 3, for example.

For example, signal processor 400 estimates parameters p (e.g., values that may be adjusted by automatic calibration) to be configured respectively in transceiver IC 201 and transceiver IC 202. When the estimated parameter of transceiver IC 201 and the estimated parameter of transceiver IC 202 are different from each other, signal processor 400 may perform processing for compensating for a deviation between the transceiver ICs, for example.

For example, signal processor 400 shown in FIG. 4 may include compensators 401, 402, 403, 404 and correlation operator 405.

Compensators 401, 402, 403, 404 compensate for the phase rotations with respect to outputs of antenna branches respectively of receive antennas 101, 102, 103, 104 (that is, compensate for deviations between the transceiver ICs), for example.

In FIG. 4, as an example, transceiver IC 201 is assumed to serve as a reference for phase rotation. In other words, compensators 401, 402, 403, 404 may compensate for deviations (e.g., differences in at least one of phase and amplitude) in transceiver IC 202 with respect to transceiver IC 201, for example. In this case, compensators 401 and 402 corresponding to transceiver IC 201 may not perform the compensation processing (in other words, may perform phase rotation compensation with phase error component of 0. On the other hand, compensators 403 and 404 corresponding to transceiver IC 202 may perform phase rotation to compensate for phase error components Δφ based on the difference in parameter configuration value between transceiver IC 201 and transceiver IC 202, for example.

An example of a compensation method in signal processor 400 will be described later.

Further, in FIG. 4, the transceiver IC serving as a reference for phase rotation (e.g., also referred to as a representative chip) is not limited to transceiver IC 201, and it may be transceiver IC 202.

For example, correlation operator 405 may perform correlation operation between signals inputted respectively from compensators 401, 402, 403, 404 (phase-compensated signals) and an array vector for direction-of-arrival estimation, to perform direction-of-arrival estimation processing. For example, correlation operator 405 may estimate a direction in which the correlation result is highest, as a direction of arrival in which an arriving wave is incident. Correlation operator 405 outputs the direction-of-arrival estimation result.

[Compensation Method]

An example of a method for compensating for the deviation (e.g., phase difference) between the transceiver ICs in radar apparatus 10 as described above will be described below.

For example, as an example of an automatic calibration function to follow environmental variation such as temperature change, it may be mentioned that radar apparatus 10 performs a control to discretely switch parameters to be configured in transceiver IC 201 or transceiver IC 202 depending on a measured temperature. Radar apparatus 10 can read out the parameters configured by automatic calibration from the outside, for example. However, in an environment where the switching of parameters occurs frequently, there is a possibility that a parameter is switched to another configured value by automatic calibration even while radar apparatus 10 reads out the parameter from the outside. In other words, radar apparatus 10 may be difficult to follow the switching of parameters by automatic calibration. When radar apparatus 10 reads out a parameter configuration value from the outside, it may be assumed that a radar transmit and receive function is temporarily stopped.

In contrast, radar apparatus 10 according to the present embodiment estimates parameters to be configured in transceiver IC 201 and transceiver IC 202, for example. In other words, in the present embodiment, radar apparatus 10 does not need to read out parameters to be configured in transceiver IC 201 and transceiver IC 202 from the outside. With this configuration, radar apparatus 10 can estimate parameter configuration values, following the switching of parameters by automatic calibration, even in an environment where the switching of parameters to be configured in transceiver IC 201 or transceiver IC 202 occurs frequently, for example. Further, radar apparatus 10 does not read out the parameters from the outside, thereby making it possible to continue, without stopping, the radar transmit and receive function, for example.

<How to Estimate Parameters>

An example of a method for estimating parameters to be configured in transceiver IC 201 and transceiver IC 202 will be described below.

For example, radar apparatus 10 is expected, as radar performance, to perform the detection of a nearer target in addition to the detection of a more distant target. As an example, such a case may be assumed in which radar apparatus 10 is installed in a bumper of a vehicle. In this case, it is possible to improve safety if radar apparatus 10 can detect the presence or absence of a target such as a person who is approaching the vehicle, for example. Further, in a case where parking space is limited, radar apparatus 10 can provide parking assistance by accurately measuring the distance between the vehicle and a target such as adjacent another vehicle or wall, for example.

Incidentally, in the case of a radar, it is difficult to remove the coupling between the radar transmitter and the radar receiver, and a radio wave (or signal component) that leaks directly from the radar transmitter into the radar receiver, so-called leak radio wave component (hereinafter, sometimes also referred to as a leak component) may exist, for example. For the leak component, a path through which it leaks within the transceiver IC (e.g., a path from a transmitter to a receiver), in addition to a path through which it leaks from the transmit antenna into the receive antenna, may also exist, for example.

In a case where a target (i.e., a reflection object) does not exist in the vicinity of radar apparatus 10, the leak component is unlikely to change due to other factors than temperature change, for example. In other words, the leak component in radar apparatus 10 can be considered to be a component that may change depending on temperature changes of transceiver ICs 201 and 202 (i.e., parameters to be configured), for example.

Note that even when an absolute phase or amplitude of the leak component changes by the temperature change, an influence due to a relative phase difference or amplitude difference in this leak component is negligible if it is between antenna branches in the same transceiver IC, for example. On the other hand, between antenna branches of the different transceiver ICs, the leak component is susceptible to the relative phase difference or amplitude difference in this leak component when the absolute phase or amplitude of the leak component change.

Therefore, in the present embodiment, radar apparatus 10 (e.g., signal processor 400) may compensate for a deviation between the transceiver ICs, based on a difference between the leak components received at the receive antennas correspondingly to the plurality of transceiver ICs (e.g., transceiver ICs 201, 202), for example. For example, a combination of parameters configured respectively in the plurality of transceiver ICs may be associated with information (e.g., a phase difference) on a difference in leak component between the transceiver ICs.

For example, radar apparatus 10 may measure a leak component deviation (e.g., phase difference) between the transceiver ICs in parameters that may be configured in the plurality of transceiver ICs (i.e., candidates for parameters to be configured). Then, radar apparatus 10 may generate information on the association between the combination of parameters and the difference in leak component in advance before actual operation of radar apparatus 10 (e.g., radar transmit and receive processing), for example (an example will be described later).

In the present embodiment, radar apparatus 10 monitors (i.e., measures) the difference in leak component (e.g., phase difference of leak component) between transceiver IC 201 and transceiver IC 202 during its actual operation. Then, radar apparatus 10 may refer to the information on the association between the combination of parameters and the difference in leak component, and configure the combination of parameters associated with the monitored difference in leak component to estimated values of the parameters configured in respective transceiver ICs 201, 202, for example.

Further, radar apparatus 10 may compensate for the phase error components based on the estimated values of the parameters (an example will be described later).

<Example of Association between Parameter and Leak Component>

The leak component may be measured in a thermostatic chamber, for example. Further, in order to suppress the influence of reflection from a side wall of the thermostatic chamber as much as possible, a side surface of the thermostatic chamber may be covered with a radio wave absorber.

Further, it may be assumed that the plurality of transceiver ICs are mounted in different locations on the same circuit board, for example. It may also be based on the premise that the temperature difference inside each transceiver IC is small compared to the temperature difference between the transceiver ICs. Further, the range (e.g., optimal value) of parameters that may be configured in the transceiver ICs may depend on each temperature region, for example.

Therefore, radar apparatus 10 may measure the difference in leak component with respect to a combination of parameters in a range assumed in each temperature region, for example. In other words, radar apparatus 10 may not measure the difference in leak component with respect to a combination of parameters in a range different from the range assumed in each temperature region, for example. Note that the measurement may be performed by increasing combinations of parameter configuration values as the temperature difference between the transceiver ICs increases, for example.

FIG. 5 is a diagram illustrating an example of an association (i.e., a list of deviation characteristics) between a combination of parameters configured respectively in transceiver IC 201 and transceiver IC 202 and a leak component phase difference measured at the time of configuring the respective parameters. Information on the association between the parameters configured in the transceiver ICs and the measured leak component phase difference may be represented by a table as shown in FIG. 5, for example.

For example, radar apparatus 10 may configure values up and down each parameter configured in transceiver IC 201 serving as a reference, to the parameters of transceiver IC 202, and measure leak component phase difference $\Delta\varphi$ between transceiver IC 201 and transceiver IC 202.

For example, a parameter configured in transceiver IC 201 shown in FIG. 5 is assumed as "$p_x$," a parameter configured in transceiver IC 202 is assumed as "$p_y$," and a leak component phase difference measured with the combination of parameter $p_x$ and parameter $p_y$ is represented as "$\Delta\varphi_{xy}$."

Note that FIG. 5 shows an example in which parameter types are of 3 bits (8 types of p1 to p8). However, the parameter types are not limited to 8 types, and other numbers may be used. Further, FIG. 5 shows a case in which one parameter up and one parameter down each parameter configured in transceiver IC 201 are configured in transceiver IC 202, but the present embodiment is not limited to this. For example, two or more parameters up and two or more parameters down each parameter configured in transceiver IC 201 may be configured in transceiver IC 202.

Calculation examples of the leak component phase difference (i.e., phase difference $\Delta\varphi_{xy}$ shown in FIG. 5) will be described below.

For example, radar apparatus 10 may calculate the respective relative phases between receive antennas 101, 102, 103, and 104 after the parameters are configured for transceiver IC 201 and transceiver IC 202 respectively.

For example, when absolute phases of receive antennas 101, 102, 103, and 104 are assumed as θa, θb, θc, and θd, respectively, radar apparatus 10 may calculate, assuming receive antenna 101 as a reference, phase difference Δφac=θc−θa with receive antenna 103 and phase difference Δφad=θd−θa with receive antenna 104 as the relative phases.

For example, radar apparatus 10 may calculate leak component phase difference $\Delta\varphi_{xy}$ based on a relative phase when same parameter $p_x$ as that for transceiver IC 201 is configured for transceiver IC 202 and a relative phase when different parameter $p_y$ from that for transceiver IC 201 is configured for transceiver IC 202.

As an example, a case in which parameter p1 is configured in transceiver IC 201 shown in FIG. 5 and parameter p2 is configured in transceiver IC 202 will be described.

Radar apparatus 10 calculates relative phases Δφac_r1 and Δφad_r1 when the same parameter (e.g., p1) is configured in transceiver IC 201 and transceiver IC 202, for example.

Further, radar apparatus 10 calculates relative phases Δφac_m2 and Δφad_m2 when parameter p1 is configured in transceiver IC 201 and parameter p2 is configured in transceiver IC 202, for example.

Further, radar apparatus 10 may calculate leak component phase difference Δφ12 based on relative phases Δφac_r1, Δφad_r1 and relative phases Δφac_m2, Δφad_m2, as follows.

$$\Delta\varphi 12 = \{(\Delta\varphi ac\_m2 - \Delta\varphi ac\_r1) + (\Delta\varphi ad\_m2 - \Delta\varphi ad\_r1)\}/2$$

In the same manner as Δφ12, radar apparatus 10 may calculate leak component phase difference $\Delta\varphi_{xy}$ in a combination of parameter $p_x$ (e.g., each of p2 to p8) configured in transceiver IC 201 serving as a reference and parameter $p_y$ configured in the other transceiver IC 202.

As seen from the above, the information on the association between the combination of parameters and the difference in leak component as shown in FIG. 5 indicates an association between an average value $\Delta\varphi_{xy}$ of a plurality of differences in a combination of receive antennas in which leak components received respectively by these receive antennas corresponding to different transceiver ICs of the plurality of transceiver ICs are different (in FIG. 5, a combination of receive antennas 101, 103 and a combination of receive antennas 101, 104) and a combination of parameters ($p_x$ and $p_y$).

For example, when radar apparatus 10 (or a product equipped with radar apparatus 10) leaves a factory, radar apparatus 10 may measure leak component deviation characteristics between the transceiver ICs (or between array antennas) with respect to a set of configuration parameters for which the automatic calibration is performed, and store the information (e.g., table) shown in FIG. 5.

<Compensation Method of Phase Error Component>

Radar apparatus 10 may measure phases of leak components in receive antennas 101, 102, 103, and 104 constituting the receive array antenna during its actual operation, and calculate phase difference Δφ of leak component in the array antenna branches between transceiver ICs 201, 202, for example.

Then, radar apparatus 10 may refer to the association between the combination of parameter configuration values and the phase difference of leak component as shown in FIG. 5, and estimate the parameters configured in respective transceiver ICs 201, 202, for example. For example, radar apparatus 10 may configure parameters (e.g., $p_x$ and $p_y$) associated with a phase difference closest to phase difference Δφ between the monitored leak components, of phase differences $\Delta\varphi_{xy}$ of leak component as shown in FIG. 5, to the estimated values of the parameters configured in respective transceiver ICs 201, 202.

For example, radar apparatus 10 may determine whether or not the estimated parameters are different between transceiver IC 201 and transceiver IC 202. For example, radar apparatus 10 may determine that the estimated parameters are different between transceiver IC 201 and transceiver IC 202 when the measured (or monitored) leak component phase difference corresponds to any of the leak component phase differences shown in FIG. 5. On the other hand, radar apparatus 10 may determine that the estimated parameters are the same between transceiver IC 201 and transceiver IC 202 when the measured leak component phase difference does not correspond to any of the leak component phase differences shown in FIG. 5 (e.g., a phase difference component is near 0), for example.

Note that the table shown in FIG. 5 may further include a leak component phase difference when the parameters of transceiver IC 201 and transceiver IC 202 are the same. This makes it possible for radar apparatus 10 to determine whether or not the measured leak component phase difference is close to the leak component phase difference when the parameters are the same, resulting in that it becomes easy to determine that the parameters are the same, for example.

Radar apparatus 10 may compensate for a deviation in transceiver IC 202 with respect to transceiver IC 201 when the estimated parameters are different between transceiver IC 201 and transceiver IC 202.

For example, radar apparatus 10 may compensate for the phase error component by multiplying the reception signal corresponding to transceiver IC 202 by a compensation vector to match characteristics when the parameter configured in transceiver IC 201 (the transceiver IC serving as a reference) is configured to other transceiver IC 202.

On the other hand, radar apparatus 10 may not compensate for a deviation in transceiver IC 202 with respect to transceiver IC 201 when the estimated parameters are the same between transceiver IC 201 and transceiver IC 202.

Then, radar apparatus 10 may perform signal processing (e.g., direction-of-arrival estimation) based on the reception signal after compensation, for example.

The example of a method for compensating for the deviation (e.g., phase difference) between the transceiver ICs in radar apparatus 10 has been described above.

As seen from the above, radar apparatus 10 compensates for a deviation between a plurality of transceiver ICs that perform signal processing on a received signal, based on a difference between leak components received at receive antennas corresponding respectively to the plurality of transceiver ICs. For example, radar apparatus 10 estimates parameters configured in the respective transceiver ICs, based on an association between a combination of parameters and a phase difference of the leak components, and compensates for the deviation between the transceiver ICs based on the estimated parameters.

As described above, the leak component phase difference measured in advance by radar apparatus 10 corresponds to a difference in leak component when different parameter $p_y$ from that for transceiver IC 201 is configured for transceiver IC 202 (in other words, when the temperature environment is different) with respect to when same parameter $p_x$ as that for transceiver IC 201 is configured for transceiver IC 202 (in other words, when the temperature environment is similar). In other words, the leak component phase difference measured in advance by radar apparatus 10 is a value that varies depending on the temperature change around transceiver IC 202 (in other words, a value associated with the change of the parameter).

Therefore, radar apparatus 10 can perform compensation processing according to the parameters configured in the plurality of transceiver ICs respectively, following the temperature change of the transceiver ICs, based on the leak component phase difference measured in advance by radar apparatus 10.

Further, radar apparatus 10 compensates for deviations between the transceiver ICs based on leak components between the transceiver ICs, for example. In other words, radar apparatus 10 may not be based on a detection result of a target when compensating for deviations between the transceiver ICs. This allows radar apparatus 10 to compensate for deviations between the transceiver ICs regardless of the presence or absence of a target (or the number of targets, the reflection intensity of a target), for example.

Further, in order to estimate parameters configured in the transceiver ICs based on the leak components measured in advance, radar apparatus 10 does not need to read out the parameters configured in the transceiver ICs from the outside, for example. This allows radar apparatus 10 to perform the compensation processing, following the environmental variation of the transceiver ICs (in other words, parameter configuration by automatic calibration), for example. Further, radar apparatus 10 can perform the compensation processing without interrupting the radar transmit and receive processing (e.g., target detection processing), for example.

As described above, according to the present embodiment, radar apparatus 10 is composed of a plurality of transceiver ICs, and suppresses a deterioration in radar performance even in such a configuration in which the individual transceiver ICs perform automatic calibration independently, thereby enabling stable operation, for example. In other words, radar apparatus 10 includes a plurality of transceiver ICs (e.g., in accordance with economic rationality) and suppresses a deterioration in radar performance, making it possible to achieve high-resolution radar processing, for example.

Therefore, according to the present embodiment, it is possible to improve the performance of radar apparatus 10 including a plurality of transceiver ICs.

Modification 1 of Embodiment 1

In FIG. 5, the case of using one phase difference $\Delta\varphi_{xy}$ (in other words, an average value of phase differences in respective array antenna branches) based on the relative phases in, with respect to transceiver IC 201 serving as a reference, receive antenna 103 and receive antenna 104 connected to the other transceiver IC 202, has been described, but the present embodiment is not limited thereto.

For example, radar apparatus 10 may hold information (e.g., a table) indicating an association between a combination of parameters configured in transceiver ICs 201, 202 respectively and a set of leak component phase differences $\Delta\varphi$ in a combination of receive antennas between different transceiver ICs, as shown in FIG. 6.

In other words, the information on the association between the combination of parameters and the difference in leak component as shown in FIG. 6 indicates an association between a set of a plurality of differences in a combination of receive antennas in which leak components received respectively by these receive antennas corresponding to different transceiver ICs of the plurality of transceiver ICs are different (in FIG. 6, a combination of receive antennas 101, 103, a combination of receive antennas 101, 104, a combination of receive antennas 102, 103, and a combination of receive antennas 102, 104) and a combination of parameters ($p_x$ and $p_y$).

In FIG. 6, as an example, the set of leak component phase differences may include leak component phase difference $\Delta\varphi$axcy between receive antenna 101 and receive antenna 103, leak component phase difference $\Delta\varphi$axdy between receive antenna 101 and receive antenna 104, leak component phase difference $\Delta\varphi$bxcy between receive antenna 102 and receive antenna 103, and leak component phase difference $\Delta\varphi$bxdy between receive antenna 102 and receive antenna 104. Here, x may indicate the number of a parameter configured in transceiver IC 201, and y may indicate the number of a parameter configured in transceiver IC 202. For example, in FIG. 6, x and y may be any value of 1 to 8.

Radar apparatus 10 may perform correlation operation between the set of leak component phase difference shown in FIG. 6 and leak component phase differences obtained by monitoring (in other words, measurement) during its actual operation, and estimate parameters associated with a set of phase differences having the highest correlation value to be the parameters configured in the respective transceiver ICs, for example.

For example, since there may be various leakage paths for the leak component, it is also assumed that the phase difference differs for each receive antenna (e.g., array antenna branch). Therefore, it is possible for radar apparatus 10 to improve estimation accuracy of the parameters by estimating the parameters based on the leak component phase difference for each array antenna branch, using the set of leak component phase difference shown in FIG. 6, for example.

Modification 2 of Embodiment 1

The radar apparatus may preconfigure (e.g., narrow down) parameters that can be taken by transceiver IC 201 serving as a reference, based on temperature information such as a temperature of the transceiver IC or a temperature around the transceiver IC, in addition to the information on leak component phase difference shown in FIG. 5 or FIG. 6, in the parameter estimation during its actual operation, for example.

For example, when the automatic calibration function is controlled depending on temperature, radar apparatus 10 can narrow down the parameters configured in the transceiver ICs by measuring (e.g., monitoring) temperature during its actual operation. This allows radar apparatus 10 to reduce the calculation amount of the parameter estimation processing, for example.

Modification 3 of Embodiment 1

In FIGS. 5 and 6, the case in which the information on the leak component phase difference is used as the difference in leak component has been described, but the present embodiment is not limited thereto. For example, parameter estimation based on information on phase and amplitude of the leak component may be applied as the difference in leak component. For example, radar apparatus 10 may perform parameter estimation based on a "vector difference" composed of phase and amplitude of the leak component.

For example, an amplitude of the leak component may differ for each antenna branch. Therefore, it is possible for radar apparatus 10 to improve estimation accuracy of the parameters by estimating the parameters based on the vector difference in leak component, for example.

FIG. 7 is a diagram illustrating an example of an association between a combination of parameters configured in transceiver ICs 201, 202 respectively and a set of leak component vector differences.

In FIG. 7, a combination of parameters and a set of vector differences composed of individual leak component vector differences between respective receive antennas 101, 102, 103, 104 are associated, for example.

Further, FIG. 7 includes a set of leak component vector differences when the parameters configured in transceiver IC 201 and transceiver IC 202 are the same, for example. This increases correlation between the parameters to be estimated, when the parameters of transceiver IC 201 and transceiver IC 202 are the same, during actual operation of radar apparatus 10, for example. Radar apparatus 10 may determine not to perform phase rotation compensation when the estimated parameters of transceiver IC 201 and transceiver IC 202 are the same, for example.

Note that the association shown in FIG. 7 is an example and the present embodiment is not limited hereto. For example, FIG. 7 may not include the association when the parameters of transceiver IC 201 and transceiver IC 202 are the same. Or, an average value of a plurality of vector differences included in the set of leak component vector differences may be used instead of the set of leak component vector differences shown in FIG. 7.

Modification 4 of Embodiment 1

For example, when a reflection object exists in the vicinity of radar apparatus 10, the leak component is susceptible to the reflection object (e.g., a reflected wave signal) detected by radar apparatus 10. In this case, there is a possibility that parameter estimation accuracy based on the leak components (e.g., the phase differences shown in FIGS. 5 and 6, or FIG. 7) measured and stored in advance by radar apparatus 10 is reduced.

On the other hand, when a reflection object exists in the vicinity of radar apparatus 10, it is sufficient that radar apparatus 10 can estimate distance even if direction-of-arrival estimation accuracy is reduced, for example. As an example of a method for estimating a distance, it is possible to estimate the position of a reflection object by such a method in which a plurality of radar apparatuses 10 are mounted on one vehicle, and the plurality of radar apparatuses 10 performs triangulation based on the distances to the reflection object detected in the vicinity by respective radar apparatuses 10.

Therefore, radar apparatus 10 may not perform (in other words, may disable) the above-described phase rotation compensation (in other words, vector compensation) when a reflection object exists in the vicinity of radar apparatus 10, for example.

Embodiment 2

In the first embodiment, the case in which the radar receiver of the radar apparatus includes the plurality of transceiver ICs has been described. In the present embodiment, a case in which a radar transmitter of a radar apparatus in addition to a radar receiver thereof also includes a plurality of transceiver ICs will be described.

Figure 8:
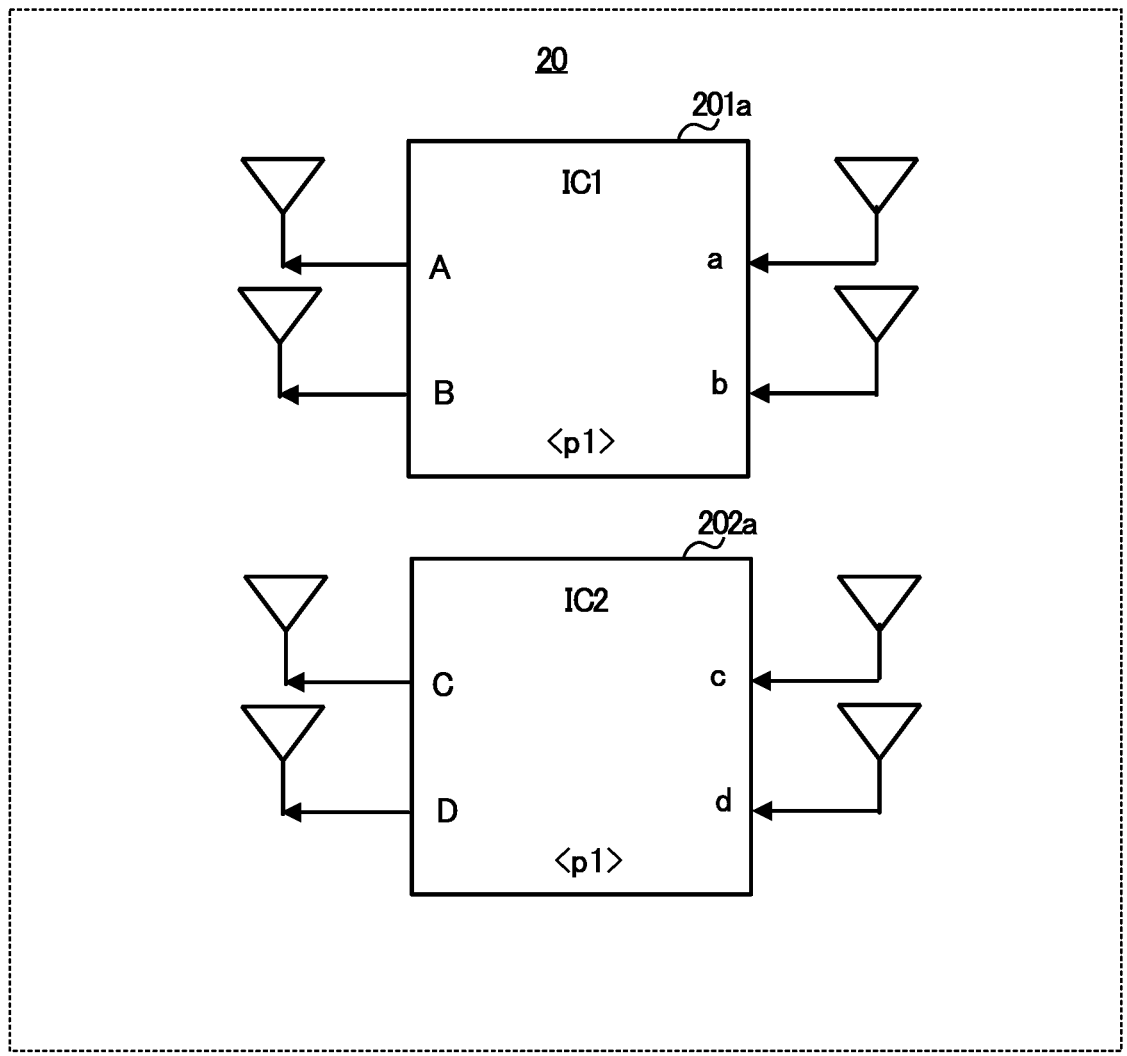
FIG. 8 is a diagram illustrating an example of a configuration of antennas and transceiver ICs in a radar apparatus according to a second embodiment.

FIG. 8 is a diagram illustrating an example of transceiver ICs that radar apparatus 20 includes according to the present embodiment. In FIG. 8, radar apparatus 20 includes transceiver IC 201*a* (e.g., sometimes also referred to as IC1) and transceiver IC 202*a* (e.g., sometimes also referred to as IC2), for example. Note that radar apparatus 20 may include signal processor 400 similar to that of radar apparatus 10 shown in FIG. 4, for example.

The transceiver ICs shown in FIG. 8 may perform transmission signal processing on signals transmitted by two brunch transmit antennas and reception signal processing on signals received by two brunch stem receive antennas. For example, transceiver IC 201*a* may perform transmission processing on signals transmitted by transmit antennas A, B and reception processing on signals received by receive antennas a, b, and transceiver IC 202*a* may perform transmission processing on signals transmitted by transmit antennas C, D and reception processing on signals received by receive antennas c, d.

Therefore, radar apparatus 20 can configure, by synchronizing two of transceiver IC 201*a* and transceiver IC 202*a* shown in FIG. 8, virtual array antenna including 16 virtual receive antennas constituted by transmit and receive antennas corresponding to the two transceiver ICs (e.g., four transmission branches and four reception branches).

In the present embodiment, radar apparatus 20 may compensate for a deviation between the transceiver ICs, based on a difference between the leak components received at the virtual receive antennas corresponding respectively to the plurality of transceiver ICs (e.g., transceiver ICs 201, 202), for example. For example, a combination of parameters configured in the plurality of transceiver ICs respectively may be associated with information (e.g., a phase difference) on a difference in leak component between the transceiver ICs.

Then, radar apparatus 20 may estimate parameters configured in respective transceiver ICs 201*a*, 202*a* based on said association, and compensate for the deviation between the transceiver ICs based on the estimated parameters, for example.

In the following, among the vectors of the leak components received at the virtual array antenna constituted by combinations of the transmit and receive antennas, a vector corresponding to a combination of transmit antenna "A" and receive antenna "a" is represented as "vAa," as an example. The same applies to the combinations of the other transmit and receive antennas.

For example, the combinations of antenna branches at which vector differences occur by being configured the different parameters due to independent automatic calibration of individual transceiver ICs are limited only to the combinations of transmit and receive antennas which are connected to other than the reference transceiver ICs.

In FIG. 8, when transceiver IC 201a is assumed to serve as a reference, the combination of the transmit and receive antennas in which a vector difference occurs comprises the following 12 branches, excluding combinations of the transmit and receive antennas connected to transceiver IC 201a (e.g., 2×2=4 combinations of transmit antennas A, B and receive antennas a, b), for example.

vAc, vAd, vBc, vBd, vCa, vCb, vCc, vCd, vDa, vDb, vDc, vDd

For example, radar apparatus 20 may calculate leak component vector difference $\Delta v$ based on a relative vector when same parameter $p_x$ as that of transceiver IC 201a is configured for transceiver IC 202a and a relative vector when different parameter $p_y$ from that for transceiver IC 201a is configured for transceiver IC 202a.

As an example, a case in which combinations of parameters p1 and p2 are configured in transceiver IC 201a and transceiver IC 202a will be described.

For example, assuming vector vAa_r1 of the virtual array antenna branch as a reference, relative vectors that are vector differences with the vectors of the transmit and receive antennas in which a vector difference may occur, when the same parameter p1 is configured in transceiver IC 201a and transceiver IC 202a, may be expressed as follows.

$\Delta vAc\_r1 = vAc\_r1 - vAa\_r1$ $\Delta vAd\_r1 = vAd\_r1 - vAa\_r1$ $\Delta vBc\_r1 = vBc\_r1 - vAa\_r1$

. . .

$\Delta vDd\_r1 = vDd\_r1 - vAa\_r1$

Further, relative vectors to the vectors of the transmit and receive antennas in which a vector difference may occur, when parameter p1 is configured in one transceiver IC of transceiver ICs 201a, 202a and parameter p2 is configured in the other transceiver IC, may be expressed as follows, for example.

$\Delta vAc\_m2 = vAc\_m2 - vAa\_m2$ $\Delta vAd\_m2 = vAd\_m2 - vAa\_m2$ $\Delta vBc\_m2 = vBc\_m2 - vAa\_m2$

. . .

$\Delta vDd\_m2 = vDd\_m2 - vAa\_m2$

Further, average of the vector differences associated with the change of parameter p1 to p2 in the other transceiver IC described above may be expressed as follows.

$\Delta v12 = \{(\Delta vAc\_m2 - \Delta vAc\_r1) + (\Delta vAd\_m2 - \Delta vAd\_r1) + (\Delta vBc\_m2 - \Delta vBc\_r1) + \ldots + (\Delta vDd\_m2 - \Delta vDd\_r1)\}/12$ Here, the combination of the transmit and receive antennas in which a vector difference occurs may be limited to 8 branches, by further excluding, from the above 12 branches, combinations of the transmit and receive antennas that can perform transmission and reception by only transceiver IC 202 (e.g., 2×2=4 combinations of transmit antennas C, D and receive antennas c, d). In this case, average of the vector differences may be expressed as follows.

$\Delta v12 = \{(\Delta vAc\_m2 - \Delta vAc\_r1) + (\Delta vAd\_m2 - \Delta vAd\_r1) + (\Delta vBc\_m2 - \Delta vBc\_r1) + \ldots + (\Delta vDb\_m2 - \Delta vDb\_r1)\}/8$ Radar apparatus 20 may store an association between the combination of parameters p1 and p2 and leak component vector difference $\Delta v12$ corresponding to this combination, for example. Further, radar apparatus 20 may store an association between a combination of other parameters and a leak component vector difference, in a manner similar to the combination of parameters p1 and p2.

Then, radar apparatus 20 may estimate parameters configured respectively in transceiver IC 201a and transceiver IC 202a, referring to the association (not shown) between the combination of parameters and the leak component vector difference, for example. For example, radar apparatus 20 may configure parameters associated with a leak component vector difference closest (having highest correlation) to the monitored leak component vector difference, of the stored leak component vector differences, to estimated values of the parameters configured in respective transceiver ICs 201a, 202a, for example.

Then, radar apparatus 20 may compensate for a deviation in transceiver IC 202a with respect to transceiver IC 201a when the estimated parameters are different between transceiver IC 201a and transceiver IC 202a.

As described above, according to the present embodiment, radar apparatus 20 includes a plurality of transceiver ICs including both of the radar transmitter and the radar receiver, and suppresses a deterioration in radar performance even in such a configuration in which the individual transceiver ICs perform automatic calibration independently, thereby enabling stable operation, for example.

Note that radar apparatus 20 may store not only the average of the leak component vector differences (e.g., relative vectors) but also a set of individual leak component vector differences. For example, radar apparatus 20 may perform correlation operation between the stored set of leak component vector differences and leak component vector differences obtained by monitoring during its actual operation, and estimate the parameter configuration value associated with a set of vector differences having the highest correlation value to be the parameters configured in the respective transceiver ICs.

The exemplary embodiments of the present disclosure have been described above.

Note that the configuration of radar apparatuses 10 and 20 in the above-described embodiments is an example, and a configuration and parameters to be configured of radar apparatuses 10 and 20 are not limited. For example, the number of transmit antennas, the number of receive antennas, the number of transceiver ICs, or the number of antennas (in other words, the number of channels) connected to the respective transceiver ICs, which radar apparatus 10 or 20 includes, is not limited to the example shown in FIG. 4 or FIG. 8. Further, the number of parameters or the combination of parameters is not limited to that in the tables shown in FIG. 5, FIG. 6, and FIG. 7, for example.

In the above-described embodiments, the case in which the processing such as estimation of parameters configured in the transceiver ICs and phase rotation compensation is performed by the radar apparatus has been described, but the present disclosure is not limited thereto. For example, the above-described compensation processing may be performed by a server located at a different location from the radar apparatus. Further, the radar transmitter and the radar receiver of the radar apparatus may be individually disposed at a location physically separated, for example.

Further, in the above-described embodiments, radar apparatus 10 may include a plurality of sets of information (e.g., a table shown in FIG. 5, FIG. 6, or FIG. 7) on the association between the combination of parameters and the difference in leak component, for example. For example, when each of the plurality of transceiver ICs that radar apparatus 10 includes is grouped into a plurality of groups, the information on the association may be configured for each group.

In the above-described embodiments, the configuration of a radar system that uses a frequency-modulated pulse wave such as a chirp signal has been described as an example, but the radar system is not limited thereto. For example, a radar system that uses a single pulse or a coded pulse is also applicable.

Various embodiments have been described above with reference to the drawings. Obviously, the present disclosure is not limited to these examples. Obviously, a person skilled in the art would arrive variations and modification examples within a scope described in claims, and it is understood that these variations and modifications are within the technical scope of the present disclosure. Each constituent element of the above-mentioned embodiments may be combined optionally without departing from the spirit of the disclosure.

The above embodiments have been described with an example of a configuration using hardware, but the present disclosure can be realized by software in cooperation with hardware.

Each functional block used in the description of each embodiment described above is typically realized by an LSI (Large Scale Integration), which is an integrated circuit. The integrated circuit controls each functional block used in the description of the above embodiments and may include an input terminal and an output terminal. The LSI may be individually formed as chips, or one chip may be formed so as to include a part or all of the functional blocks. The LSI herein may be referred to as an IC (Integrated Circuit), an SSI (Small Scale Integration), an MSI (Middle Scale Integration), a system LSI, a super LSI, a VLSI (Very Large Scale Integration), or an ultra LSI depending on a difference in the degree of integration.

Further, the technique of implementing an integrated circuit is not limited to the LSI and may be realized by using a dedicated circuit, a general-purpose processor, or a special-purpose processor. In addition, a Field Programmable Gate Array (FPGA) that can be programmed or a reconfigurable processor in which the connections and the settings of circuit cells disposed inside the LSI can be reconfigured may be used after the manufacture of the LSI.

Furthermore, if future integrated circuit technology replaces LSIs as a result of the advancement of semiconductor technology or other derivative technology, the functional blocks could be integrated using the future integrated circuit technology. Biotechnology can also be applied.

The present disclosure can be implemented in apparatuses, devices, and systems of any kind, each being provided with a communication function, (collectively referred to as "communication apparatuses"). Non-limiting examples of the communication apparatuses include telephones (such as portable phones and smartphones), tablets, personal computers (PCs) (such as laptops, desktops, and notebooks), cameras (such as digital still/video cameras), digital players (such as digital audio/video players), wearable devices (such as wearable cameras, smartwatches, and tracking devices), game consoles, digital book readers, telehealth telemedicine (remote healthcare medicine prescription) devices, communication-function-equipped vehicles or transportation (such as automobiles, airplanes and ships), and a combination of the above-mentioned apparatuses of various kinds.

The communication apparatuses are not limited to portable or mobile apparatuses and thus include unportable or fixed apparatuses, devices, and systems of any kind, such as smart home devices (e.g., appliances, lighting equipment, smart meters or measuring instruments, and control panels), vending machines, and Internet of Things ("IoT"; every "things" that may exist on networks).

In addition to data communication via cellular systems, wireless LAN systems, communication satellite systems and/or the like, communication includes data communication via a combination of these systems. Further, the communication apparatuses include devices, such as controllers or sensors to be connected to or linked to a communication device which executes communication functions described in the present disclosure. Controllers or sensors are included, for example, each of which is configured to generate a control signal and/or a data signal used by the communication device which executes the communication functions of the communication apparatuses.

Further, the communication apparatuses include infrastructure equipment which performs communication with the above-mentioned non-limiting apparatuses of various kinds or which controls these non-limiting apparatuses of various kinds, such as base stations, access points, apparatuses of any other kinds, devices, and systems.

The expression "section" used in the above-described embodiments may be replaced with another expression such as "circuit (circuitry)," "assembly," "device," "unit," or "module."

Summary of Present Disclosure

A radar apparatus according to an exemplary embodiment of the present disclosure includes: a plurality of integrated circuitries, which, in operation, perform signal processing on a received signal; and signal processing circuitry, which, in operation, compensates for a deviation between the plurality of integrated circuitries based on a difference between leak radio wave components received by receive antennas corresponding respectively to the plurality of integrated circuitries.

In an exemplary embodiment of the present disclosure, the signal processing circuitry estimates parameters configured respectively in the plurality of integrated circuitries, based on the difference between the leak radio wave components, and compensates for the deviation based on the estimated parameters.

In an exemplary embodiment of the present disclosure, the signal processing circuitry estimates the parameters based on information on an association between a combination of the parameters to be configured respectively in the plurality of integrated circuits and the difference between the leak radio wave components.

In an exemplary embodiment of the present disclosure, the information indicates an association between an average value of a plurality of differences in a combination of receive antennas in which the leak radio wave components received respectively by the receive antennas corresponding to different integrated circuitries of the plurality of integrated circuitries are different, and the combination of parameters.

In an exemplary embodiment of the present disclosure, the information indicates an association between a set of a plurality of differences in a combination of receive antennas in which the leak radio wave components received respectively by the receive antennas corresponding to different integrated circuitries of the plurality of integrated circuitries are different, and the combination of parameters.

In an exemplary embodiment of the present disclosure, the signal processing circuitry compensates for the deviation when the parameters estimated respectively for the plurality of integrated circuitries differ from each other.

In an exemplary embodiment of the present disclosure, the plurality of integrated circuitries perform the signal processing on a signal to be transmitted, and the receive antennas include virtual receive antennas constituted by transmit and receive antennas corresponding to the plurality of integrated circuitries.

In an exemplary embodiment of the present disclosure, the difference is a phase difference of the leak radio wave components.

In an exemplary embodiment of the present disclosure, the difference is a difference of vectors composed of a phase and an amplitude of the leak radio wave components.

While various embodiments have been described herein above, it is to be appreciated that various changes in form and detail may be made without departing from the sprit and scope of the invention(s) presently or hereafter claimed.

This application is entitled and claims the benefit of Japanese Patent Application No. 2020-051566, filed on Mar. 23, 2020, the disclosure of which including the specification, drawings and abstract is incorporated herein by reference in its entirety.

INDUSTRIAL APPLICABILITY

The present disclosure can be applied to a radar apparatus using a radio signal such as a millimeter-wave band.

REFERENCE SIGNS LIST 10, 20 Radar apparatus
101, 102, 103, 104 Receive antenna
201, 201 Transceiver IC
300, 400 Signal processor
401, 402, 403, 404 Compensator
405 Correlation operator

The invention claimed is:

1. A radar apparatus comprising:
a plurality of integrated circuitries, which, in operation, perform signal processing on a received signal; and
signal processing circuitry, which, in operation, compensates for a deviation between the plurality of integrated circuitries,
wherein the signal processing circuitry, which, in operation, compensates the deviation between one integrated circuitry of the plurality of integrated circuitries and remaining integrated circuitries of the plurality of integrated circuitries with reference to leak radio wave components received by receive antennas connected to the one integrated circuitry of the plurality of integrated circuitries.

2. The radar apparatus according to claim 1, wherein
the signal processing circuitry estimates parameters configured respectively in the plurality of integrated circuitries, based on the difference between the leak radio wave components, and compensates for the deviation based on the estimated parameters.

3. The radar apparatus according to claim 2, wherein
the signal processing circuitry estimates the parameters based on information on an association between a combination of the parameters to be configured respectively in the plurality of integrated circuits and the difference between the leak radio wave components.

4. The radar apparatus according to claim 3, wherein
the information indicates an association between an average value of a plurality of differences in a combination of receive antennas in which the leak radio wave components received respectively by the receive antennas corresponding to different integrated circuitries of the plurality of integrated circuitries are different, and the combination of parameters.

5. The radar apparatus according to claim 3, wherein
the information indicates an association between a set of a plurality of differences in a combination of receive antennas in which the leak radio wave components received respectively by the receive antennas corresponding to different integrated circuitries of the plurality of integrated circuitries are different, and the combination of parameters.

6. The radar apparatus according to claim 2, wherein
the signal processing circuitry compensates for the deviation when the parameters estimated respectively for the plurality of integrated circuitries differ from each other.

7. The radar apparatus according to claim 1, wherein
the plurality of integrated circuitries perform the signal processing on a signal to be transmitted, and
the receive antennas comprise virtual receive antennas constituted by transmit and receive antennas corresponding to the plurality of integrated circuitries.

8. The radar apparatus according to claim 1, wherein
the difference is a phase difference of the leak radio wave components.

9. The radar apparatus according to claim 1, wherein
the difference is a difference of vectors composed of a phase and an amplitude of the leak radio wave components.

* * * * *